March 9, 1965 V. F. SABOL 3,172,690
COUPLINGS
Filed May 19, 1961

WITNESSES
Edwin C. Bassler
James F. Young

INVENTOR
Victor F. Sabol
BY
Ralph W. McIntire
ATTORNEY 3,172,690
COUPLINGS
Victor F. Sabol, East Pittsburgh, Pa., assignor to Westinghouse Electric Corporation, East Pittsburgh, Pa., a corporation of Pennsylvania
Filed May 19, 1961, Ser. No. 111,310
6 Claims. (Cl. 287—88)

The invention relates, generally, to couplings, and, more specifically, to a ball and socket coupling.

It is generally known in the prior art to segment the ball element of a ball and socket joint to facilitate easy assembly of the joint, as shown for example, in Patents 2,478,056; 2,126,388; and 2,652,221. However, these structures will not permit assembly of a ball and socket joint in the manner disclosed therein if it is desired to integrate the segmented ball with other structure.

It is an object of this invention to provide a ball and socket joint, wherein the ball is integral with additional structure, and wherein the ball and additional structure are segmented in a novel manner to provide for quick and easy assembly of the joint without the use of tools or machinery.

It is another object of the present invention to provide in a ball and socket joint having a segmented ball for easy assembly of the joint, a novel segmented structure for eliminating undesired friction between the ball segments and the socket.

Other objects of the present invention will become readily apparent upon reading of the following specification in association with the accompanying drawings, in which.

Generally, the present invention comprises a ball and socket joint for connecting two operating members wherein a segmented ball member slides within a socket having fixed dimensions. Each of the segments of the ball is sector-shaped and includes at its ends an integral segment of a spacer element for spacing the ball from portions of the connector means which connects the ball to one of the operating members. Each of the segments is substantially less than a 120° arc portion of the ball surface, thus providing clearance between the segments when they are spread to engage the socket wall by insertion of a pin through a bore along the axis of the ball and spacers. The space or clearance between segments facilitates radially inward collapse of the three segments into abutting relationship with each other to facilitate easy insertion of the ball segments within the socket during the assembly of the joint, thus eliminating the need for tools or machines in the performance of the assembly operation. Thereafter, insertion of a pin centrally through an aperture in the ball assembly and spacer assemblies spreads the segments into mating relationship with the socket, thus disposing the segments into a true ball and at the same time providing freedom of movement between the ball segments, their socket, and the pin. The ends of the bearing surface of each segment are recessed to eliminate scoring or binding contact being the segments and the socket wall, and thus to eliminate expensive and precise machining which would otherwise be required. The recessed edges also eliminate the tendency of a low friction coating surface on the ball segments to peel away from the ball segment core.

Figure 1:
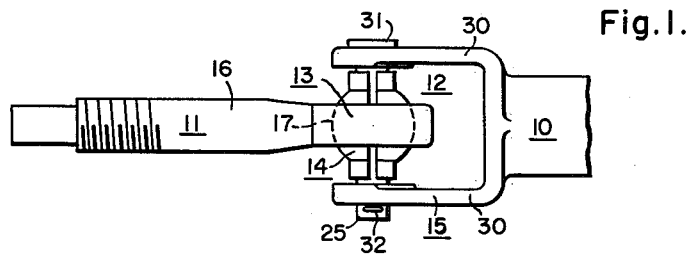
FIGURE 1 is a side elevational view of a ball and socket joint connecting two relatively movable operating members, and showing the present invention.

Referring to FIG. 1 of the drawing, there is shown a first operating member, indicated generally at 10, and a second operating member indicated generally at 11, the first and second members being connected for relative movement by means of a universal joint, indicated generally at 12.

The universal joint comprises a socket member 13 connected to the operating member 11, and a ball member 14 slidably mounted within the socket and connected to operating member 10 by means of connector means generally indicated at 15.

The operating member 11 comprises a shank 16 having the socket member 13 integrally fixed at one end thereof. The socket 13 comprises an eye having an internal annular bearing 17 of concave cross-section for receiving the ball 14 as hereinafter described.

Figure 2:
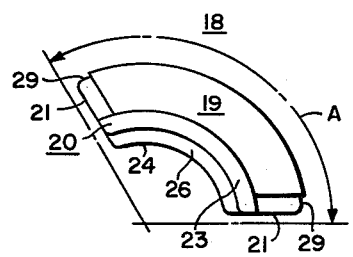
FIGURE 2 is a top plan view of a segment of the ball shown in FIG. 1.
Figure 3:
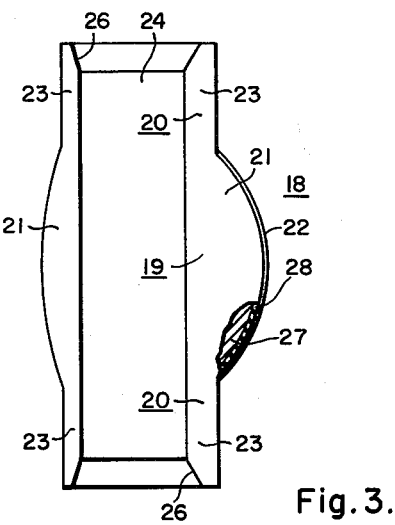
FIG. 3 is a view in front elevation of the ball segment of FIG. 2.
Figure 4:
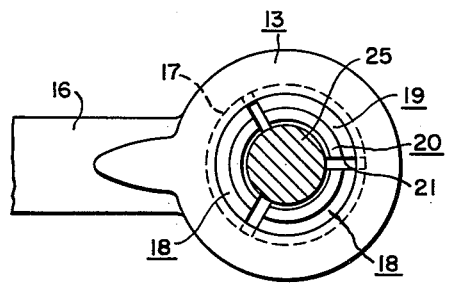
FIG. 4 is a top plan view taken in section of the ball and socket connection shown in FIG. 1.

The ball member 14 is comprised of a plurality of segments 18, as best seen in FIGS. 2 and 3, each segment including a ball sector portion 19 and a pair of integral cylindrical sector portions 20, 20 on opposite ends of the main ball sector 19. The main ball sector portion 19 is defined by a pair of radially disposed surfaces 21, 21 connected by an outer bearing surface 22 disposed on the arc of a circle between the radially disposed surfaces. Each cylindrically shaped sector 20, 20 comprises a pair of radially disposed surfaces 23, 23 integral with and disposed in the plane of the ball sector side surfaces 21, 21 and includes an outer surface of any suitable shape, connecting the surfaces 23, 23.

The inner end of each sector 19 includes a cylindrically curved bore sector defining a bearing surface 24 for slidably bearing against a cylindrical pin member 25, hereinafter described as a portion of the connector means 15. The cylindrical surface 24 extends the full length of each segment 18, including the spherical section 19 and the two cylindrical sections 20, 20 for receiving the pin 25 therethrough. A tapered mouth portion 26 is provided at the end of each cylindrical surface 24 to serve as a guide for receiving the pin 25 during assembly as hereinafter described. If desired, the tapered portion 26 may be omitted and the end of the pin 25 may be tapered as an alternate form of construction.

It is to be especially noted that the length of the arc of the bearing surface 22 of each sector 19 is substantially less than 360° divided by the total number of sectors in the ball. Any number of sectors may be utilized in comprising the complete ball; however, in the particular embodiment shown herein, the number of segments or sectors is three. Thus, the arc of each segment is substantially less than 120° or the angle "A," as clearly indicated in FIG. 2. This structure provides for an easy assembly of the segments 18 within socket 13, whereby the individual segments may be placed one by one within the socket 13, with the side surfaces 21, 21 of adjacent segments being pressed into engagement with the other, whereby ample space is provided within the socket for inserting the last segment quickly and easily within the socket 13. It is readily seen that in the absence of the provision of such spaces between segments, the individual segments could not be inserted lengthwise within the socket since the spacer segments 20, 20 would prevent insertion of the segments within the socket by the assembly method of the prior art, whereby the bearing surface 22 is slid along the arc of the socket 13. After the segments are positioned within the socket 13, the pin 25 is easily inserted within the central bore as facilitated by the guide surfaces 26, 26 on the segments 20, 20, spreading the segments into bearing engagement with the socket bearing 17.

The segments 18 may be constructed of any suitable material or materials as desired. However, in the particular embodiment disclosed, the ball segments 18 are comprised of a suitable core material 27, such as bronze, which is coated with a low friction material 28, such as one of the fluorocarbons, or nylon to minimize the friction between the bearing surfaces 22 of the ball 14 and the bearing surface 17 of the socket 13.

In order to eliminate the tendency of the coating 28 to peel away from the core 27, under excessive sliding stress between the surface 22 and 17 because of the presence of high spots on the ends of the bearing surface 22, which high spots may result if the segments are produced by inexpensive die forming operations, the bearing surfaces 22 are recessed at their ends 29, as by the use of sizing dies after construction of the basic segment 18. The simple expedient of recessing the ends 29, 29 eliminates the high spots and prevents breakage in the surface of the coating 28 and thus minimizes the peeling action. Only a small recess is required on the order of .0015 inch below the bearing surface 22. The size of the recess is exaggerated in FIG. 2 of the drawing for purposes of illustration.

The hereinbefore mentioned high spots on the ends of the bearing surface 22 result if the bearing segments 18 are die formed by a pair of dies which form the bearing segments by moving toward each other in a direction perpendicular to the axis of the bore 24 on the segment 18.

Another type of die forming operation can be employed for forming the bearing segment 18 wherein a pair of dies move toward each other in a direction parallel to the axis of the bore 24. Using this method, no high spots result on the ends of the bearing surface 22, but a peripheral flat spot results on the surface 22 on the midsection of bearing segment 18, which flat spot could cause bending of the segment 18 in the socket 13 for certain relative proportions between the socket and bearing segment.

According to the present invention, as discussed above, an inexpensive method of producing a good bearing surface by using inexpensive die forming operations of the bearings comprises die forming the basic bearing with a die forming operation as described which results in high spots on the ends of the bearing rather than low spots on the bearing surface, and then eliminating the localized high spots by sizing dies which effect recess of the bearing ends below the remainder of the bearing surface. The recessing of the end portions of the bearing provides no advantage in itself but provides for a relatively gross inexpensive die sizing operation which need only effect recessing, thus eliminating the expense of precise operation, that would be required to size down the high spots to the exact curvature of the bearing surface 22.

The recessed ends 29, 29 are advantageous even in uncoated bearings in that they eliminate ragged edges on the ball segments 18 which might have a tendency to score or bind against the bearing surface 17 of the socket 13.

As shown in FIG. 1, the operating arm 10 includes a bifurcated end comprising a connector 15 having a pair of spaced parallel arms 30, 30, which arms are suitably apertured at their free ends to receive therethrough the pin member 25. The pin includes a head portion 31 at one end bearing against the outer surface of one of the arms 30. The pin is mounted for free rotational movement within the apertures but is prevented from axial movement by means of a cotter pin 32 in the other end serving as stop means.

From the foregoing, it will be seen that the instant spacer segments 20, 20 bear against the inner sides of arms 30, 30 to centralize and space the ball 14 between the arms 30, 30 and provide maximum movement for the operating arm 11 thereon.

The provision of the spacers as an integral part of the ball 14 decreases assembly time of the joint and of the entire coupling member and provides a lower cost than that which would result if the spacers were separate articles of manufacture.

Reference is made to copending application Serial No. 98,240, filed March 24, 1961, which is assigned to the same assignee as the present application and which issued February 26, 1963, as U.S. Patent 3,079,474, showing a ball and socket joint which may be of the present type for connecting a pair of operating members of the type shown herein in a disconnect switch operating mechanism.

Having described a preferred embodiment of this invention in accordance with the patent statutes, it is desired that this invention be not limited to this particular embodiment inasmuch as it will be apparent, particularly to persons skilled in this art, that many modifications and changes may be made in this particular structure without departing from the broad spirit and scope of the invention. Accordingly, it is desired that the invention be interpreted as broadly as possible and that it be limited only as required by the prior art.

I claim as my invention:

1. A coupler, comprising: a unitary socket member having an annular bearing surface of concave cross-section; a plurality of bearing elements disposed within said socket members; each of said elements being sector-shaped and including an outer convex bearing portion disposed in slidable mating engagement with said concave bearing surface, and an inner surface shaped to comprise a sector of a cylindrical bore, each convex bearing surface comprising an arc less than 360° divided by the total number of said plurality of bearing elements; a pair of oppositely extending, aligned integral members, each member individual to an end of each bearing element and extending externally of said socket member and including an inner surface radially coextensive with the bore sector on said bearing portion, said bearing elements being circumferentially spaced from one another sufficiently to permit assembly of said bearing elements into said unitary socket member.

2. A coupler, comprising: a unitary socket member having an annular bearing surface; a plurality of bearing elements disposed within said socket member, each of said bearing elements having an inner surface cooperating with those of the other bearing elements providing an axial cylindrical passage for receiving an elongated member; each bearing element having an outer bearing surface portion slidably engaging said socket bearing surface and having a pair of planar side surfaces, each side surface joining the bearing surface to the inner surface and extending radially outwardly from said axial passage; the circumferential end portions of each outer bearing surface being depressed with respect to the remainder of said outer bearing surface to avoid contact with said annular bearing surface, the adjacent planar side surfaces of each of said bearing elements being circumferentially spaced from each other sufficiently to permit assembly of said bearing elements into said unitary socket member.

3. A ball and socket joint, comprising: a unitary socket member having an annular bearing surface of concave cross-section; a ball disposed within said socket; said ball comprising a plurality of individual ball sector elements; each ball sector element having an inner surface cooperating with the inner surfaces of the other ball sector elements to define an axial cylindrical passage for receiving a pin member, an outer bearing surface of convex curvature for mating in bearing relationship with the concave bearing surface, and a pair of planar side walls each connecting one end of the bearing surface to one end of the inner bearing surface and extending radially outwardly from said axial passage, the adjacent planar side walls of each of said ball sector elements being circumferentially spaced from one another sufficiently to permit assembly of said ball sector elements into said unitary socket member; the circumferential end portions of each convex bearing surface being depressed with respect to the remainder of said convex bearing surface to avoid contact with said annular bearing surface.

4. A coupler, comprising: a unitary socket member having an annular bearing surface; a plurality of bearing elements disposed within said socket, each of said bearing elements having an inner surface cooperating with those of the other bearing elements providing an axial cylindrical passage for receiving an elongated member; each bearing element having an outer bearing portion slidably engaging said socket bearing surface and having a pair of planar side surfaces, each side surface joining the bearing surface to the inner surface and extending radially outwardly from said axial passage, the adjacent planar side surfaces of each of said bearing elements being circumferentially spaced from each other sufficiently to permit assembly of said bearing elements into said unitary socket member; the joint between each bearing surface and said side surface comprising a recessed circumferential end portion of the outer bearing portion for eliminating high spots at the ends of the outer bearing portion and avoiding contact with said annular bearing surface; and a covering of low friction material on at least the outer bearing portion of each bearing element, excluding the depressed recessed end portions.

5. A ball and socket joint, comprising: a unitary socket member having an annular bearing surface of concave cross-section; a ball disposed within said socket; said ball comprising a plurality of individual ball sector elements; each ball sector element having an inner surface cooperating with the inner surfaces of the other ball sector elements to define an axial cylindrical passage for receiving a pin member, an outer bearing surface of convex curvature for mating in bearing relationship with the concave bearing surface, and a pair of planar side walls each connecting one end of the bearing surface to one end of the inner bearing surface and extending radially outwardly from said axial passage, the adjacent planar side walls of each of said ball sector elements being circumferentially spaced from one another sufficiently to permit assembly of said ball sector elements into said unitary socket member; the jointure between each side surface and the convex bearing surface being recessed with respect to the remainder of the convex bearing surface to avoid contact with said annular bearing surface; and a covering of low friction material on at least the outer bearing surface of each segment.

6. A coupling, comprising: a first operating member including a unitary socket therein; said socket having an annular bearing surface of concave cross-section; a second operating member having a pair of spaced arms on one end portion thereof; an aperture in each of said arms having a predetermined diameter; said arms straddling said socket with the apertures disposed on the socket axis and in spaced relationship with respect to the socket; a plurality of bearing elements disposed within said socket; each of said bearing elements being sector-shaped and including an outer convex bearing portion disposed in slidable mating engagement with said concave bearing surface, and an inner surface shaped to comprise a sector of a cylindrical bore, each convex bearing surface comprising an arc less than 360° divided by the total number of said bearing elements, said bearing elements being circumferentially spaced from one another sufficiently to permit assembly of said bearing elements into said unitary socket member; a pair of oppositely extending members formed integrally with the end portions of each bearing element to extend externally of said bore sector and including an inner surface radially coextensive with the bore sector on said bearing portion; said bore sectors collectively comprising a cylindrical bore having a diameter substantially the same as that of said apertures; a pin extending through said apertures and said bore; and means disposed on said pin for preventing axial movement of said pin within said bore.

References Cited by the Examiner
UNITED STATES PATENTS

| | | | |
|---|---|---|---|
| 259,957 | 6/82 | White | 287—88 |
| 566,361 | 8/96 | White | 287—88 |
| 1,464,815 | 8/23 | Gehrig | 287—88 |
| 2,066,695 | 1/37 | Peo. | |
| 2,068,917 | 1/37 | Hufferd. | |
| 2,076,028 | 4/37 | Hufferd. | |
| 2,260,283 | 10/41 | Halford et al. | |
| 2,401,814 | 6/46 | Burhans | 287—88 |
| 2,401,838 | 6/46 | Mitchell | 287—88 |
| 2,652,221 | 9/53 | Kampa | 287—88 |
| 2,717,792 | 9/55 | Pelley | 287—88 |
| 2,905,492 | 9/59 | Alexander | 287—87 |
| 2,952,901 | 9/60 | King. | |
| 2,958,927 | 11/60 | Kravats. | |

FOREIGN PATENTS

| | | |
|---|---|---|
| 892,404 | 8/53. | Germany. |
| 589,538 | 23/47 | Great Britain. |
| 860,774 | 8/61 | Great Britain. |

CARL W. TOMLIN, *Primary Examiner.*

JACOB A. MANIAN, WALTER A. SCHEEL,
*Examiners.*